United States Patent
Gihm et al.

(10) Patent No.: US 11,600,196 B2
(45) Date of Patent: Mar. 7, 2023

(54) METHOD AND SYSTEM FOR SUPPORTING LEARNING, AND NON-TRANSITORY COMPUTER-READABLE RECORDING MEDIUM

(71) Applicant: VITRUV INC., Seoul (KR)

(72) Inventors: Se Hoon Gihm, Seongnam-si (KR); Myung Hoon Ahn, Seongnam-si (KR); Tae Hyoung Oh, Seoul (KR); Du Seop Jung, Seongnam-si (KR)

(73) Assignee: VITRUV INC., Seoul (KR)

( * ) Notice: Subject to any disclaimer, the term of this patent is extended or adjusted under 35 U.S.C. 154(b) by 306 days.

(21) Appl. No.: 16/492,695

(22) PCT Filed: Mar. 21, 2017

(86) PCT No.: PCT/KR2017/003021
§ 371 (c)(1),
(2) Date: Jan. 7, 2020

(87) PCT Pub. No.: WO2018/169115
PCT Pub. Date: Sep. 20, 2018

(65) Prior Publication Data
US 2020/0242956 A1     Jul. 30, 2020

(30) Foreign Application Priority Data

Mar. 13, 2017   (KR) .................. 10-2017-0031255

(51) Int. Cl.
*G09B 7/04*     (2006.01)
*G09B 5/12*     (2006.01)

(52) U.S. Cl.
CPC ................ *G09B 7/04* (2013.01); *G09B 5/12* (2013.01)

(58) Field of Classification Search
None
See application file for complete search history.

(56) References Cited

U.S. PATENT DOCUMENTS

| 6,554,618 B1 * | 4/2003 | Lockwood | ............... | G09B 7/00 434/118 |
| 7,286,793 B1 * | 10/2007 | Miele | ...................... | G09B 7/00 434/323 |

(Continued)

FOREIGN PATENT DOCUMENTS

| KR | 20050025858 A | 3/2005 |
| KR | 20060007608 A | 1/2006 |

(Continued)

OTHER PUBLICATIONS

International Search Report for PCT/KR2017/003021 dated Oct. 24, 2017.

*Primary Examiner* — Thomas J Hong
(74) *Attorney, Agent, or Firm* — Dinsmore & Shohl LLP; Yongsok Choi, Esq.

(57) ABSTRACT

The present invention relates to a method, system, and non-transitory computer-readable recording medium for supporting learning. According to one aspect of the invention, there is provided a method for supporting learning, the method comprising the steps of: acquiring a learner's score for at least one assessment item included in a scoring table, wherein the learner has solved a question for learning and the scoring table is applied to a descriptive answer of the learner; determining a weak learning element of the learner with reference to the acquired score and at least one learning element associated with the at least one assessment item; and determining a supplementary learning path to be provided to the learner with reference to the determined weak learning element.

4 Claims, 3 Drawing Sheets

(56) References Cited

U.S. PATENT DOCUMENTS

| | | | |
|---|---|---|---|
| 10,679,512 B1* | 6/2020 | Yang | G09B 7/02 |
| 2003/0039948 A1* | 2/2003 | Donahue | G09B 7/02 |
| | | | 434/322 |
| 2003/0129576 A1* | 7/2003 | Wood | G09B 7/02 |
| | | | 434/362 |
| 2004/0018479 A1* | 1/2004 | Pritchard | G09B 7/02 |
| | | | 434/350 |
| 2004/0063085 A1* | 4/2004 | Ivanir | G09B 7/08 |
| | | | 434/322 |
| 2006/0099563 A1* | 5/2006 | Liu | G09B 7/02 |
| | | | 434/350 |
| 2007/0172809 A1* | 7/2007 | Gupta | G09B 7/00 |
| | | | 434/350 |
| 2008/0057480 A1* | 3/2008 | Packard | G09B 23/02 |
| | | | 434/188 |
| 2008/0227075 A1* | 9/2008 | Poor | G06V 10/40 |
| | | | 434/307 R |
| 2009/0287619 A1* | 11/2009 | Liang | G06Q 50/20 |
| | | | 706/11 |
| 2010/0041007 A1* | 2/2010 | Wang | G09B 7/00 |
| | | | 434/322 |
| 2012/0244510 A1* | 9/2012 | Watkins, Jr. | G09B 7/00 |
| | | | 434/362 |
| 2014/0065590 A1* | 3/2014 | Kim | G06Q 50/205 |
| | | | 434/322 |
| 2014/0242567 A1* | 8/2014 | Lee | G09B 7/06 |
| | | | 434/362 |
| 2014/0279727 A1* | 9/2014 | Baraniuk | G06N 20/00 |
| | | | 706/11 |
| 2014/0342342 A1* | 11/2014 | Drummond | G09B 7/06 |
| | | | 434/362 |
| 2015/0325138 A1* | 11/2015 | Selinger | G09B 7/00 |
| | | | 434/322 |
| 2016/0035238 A1* | 2/2016 | Won | G09B 7/02 |
| | | | 434/188 |
| 2018/0090026 A1* | 3/2018 | Ahn | G09B 7/077 |
| 2019/0325773 A1* | 10/2019 | Cho | G09B 7/04 |

FOREIGN PATENT DOCUMENTS

| | | |
|---|---|---|
| KR | 20070119803 A | 12/2007 |
| KR | 20090001485 A | 1/2009 |
| KR | 20120019884 A | 3/2012 |

* cited by examiner

OOO University Scoring Table 2016 — 320

| Applied department | Submission date | Affiliation | Name |
|---|---|---|---|

| Topics | | Assessment items | Allotted points | Scores |
|---|---|---|---|---|
| Q1 | 1-1 | Find the number of elements in the set $\{x \subseteq A_1 | f_1(x) = 1\}$. | 5 | |
| | | Found that the number of element is $2^{n-1}$? (0 points for the wrong answer) | | |
| | 1-2 | When n=3, show the graphs $\{(x, P_i(x)) | x \subseteq A_1\}$ of the function $P_i$ on the coordinate plane for the cases where i = 1 and 2, respectively. | | |
| | | Understood that the value of $P_i(x)$ is -1 or 1? | 1 | |
| | | Correctly shown $\{(x, P_1(x)) | x \subseteq A_1\}$? | 2 | |
| | | Correctly shown $\{(x, P_2(x)) | x \subseteq A_1\}$? | 2 | |
| Q2 | 2-1 | When t = π/2, find the area of the figure $R_t$. | | |
| | | Correctly found π/2? | 5 | |
| | 2-2 | Find the function R(t) for 0 ≤ t ≤ π/2. | | |
| | | Correctly described the shape of $R_t$? | 3 | |
| | | Correctly found the maximum value x(t)=t+cos t? (If the solving process is correct but the answer is wrong, up to 3 points are given.) | 7 | |
| | | Total Score | 60 | |

- C712 understanding (concept of behavioral abilities)
  - C302
  - C516
  - ......

- C713 inference (concept of behavioral abilities)
  - C354
  - C576
  - C516
  - C302
  - ......

- C714 calculation (concept of behavioral abilities)
  - C413
  - C412
  - C389
  - C302
  - C516
  - ......

METHOD AND SYSTEM FOR SUPPORTING LEARNING, AND NON-TRANSITORY COMPUTER-READABLE RECORDING MEDIUM

CROSS-REFERENCE TO RELATED APPLICATION(S)

This application is a continuation application of Patent Cooperation Treaty (PCT) International Application Serial No. PCT/KR2017/003021, filed on Mar. 21, 2017, which claims priority to Korean Patent Application Serial No. 10-2017-0031255, filed on Mar. 13, 2017. The entire contents of PCT International Application Serial No. PCT/KR2017/003021 and Korean Patent Application Serial No. 10-2017-0031255 are hereby incorporated by reference.

FIELD OF THE INVENTION

The present invention relates to a method, system, and non-transitory computer-readable recording medium for supporting learning.

BACKGROUND

With the development of the Internet and multimedia technology, learners can not only be provided with lectures for learning anytime and anywhere, but also get various assessments of the learning and receive feedback on the assessments of the learning.

As an example of related conventional techniques, a method for online provision of learning has been introduced in which a learner is provided with questions for diagnosing learning ability on a web site for learning and enters answers to the questions, so that the answers are automatically scored to calculate an assessment score, and the learner moves onto the next course when the assessment score is not lower than a predetermined score, while the learner repeats questions of the previous course when the assessment score is lower than the predetermined score.

However, according to the techniques introduced so far as well as the above-described conventional technique, the types of questions that can be provided to the learner online are limited to multiple-choice or short-answer question types due to issues such as automatic scoring, and even after the assessment has been carried out, only questions of the same course as the questions that the learner has gotten incorrect are provided to the learner for supplementary learning of the learner. Particularly, unlike other types of questions, an answer to a descriptive question can only be assessed through a scorer's subjective judgment and manual work, and thus it is difficult to find out weak points of the learner for the descriptive question.

In this connection, the inventor(s) present a technique for determining a weak learning element of a learner who has solved a question for learning, on the basis of the learner's score for at least one assessment item included in a scoring table applied to a descriptive answer of the learner, and determining a supplementary learning path to be provided to the learner, with reference to the determined weak learning element.

SUMMARY OF THE INVENTION

One object of the present invention is to solve all the above-described problems in the prior art.

Another object of the invention is to derive a weak learning element of a learner with reference to assessment items included in a scoring table applied to a descriptive answer of the learner.

Yet another object of the invention is to determine a supplementary learning path associated with a weak learning element of a learner to supplement the weak learning element.

The representative configurations of the invention to achieve the above objects are described below.

According to one aspect of the invention, there is provided a method for supporting learning, the method comprising the steps of: acquiring a learner's score for at least one assessment item included in a scoring table, wherein the learner has solved a question for learning and the scoring table is applied to a descriptive answer of the learner; determining a weak learning element of the learner with reference to the acquired score and at least one learning element associated with the at least one assessment item; and determining a supplementary learning path to be provided to the learner with reference to the determined weak learning element.

According to another aspect of the invention, there is provided a system for supporting learning of, the system comprising: an assessment item information acquisition unit configured to acquire a learner's score for at least one assessment item included in a scoring table, wherein the learner has solved a question for learning and the scoring table is applied to a descriptive answer of the learner; a weak learning element determination unit configured to determine a weak learning element of the learner with reference to the acquired score and at least one learning element associated with the at least one assessment item; and a supplementary learning path determination unit configured to determine a supplementary learning path to be provided to the learner with reference to the determined weak learning element.

In addition, there are further provided other methods and systems to implement the invention, as well as non-transitory computer-readable recording media having stored thereon computer programs for executing the methods.

According to the invention, it is possible to derive a weak learning element of a learner with reference to assessment items included in a scoring table applied to a descriptive answer of the learner.

According to the invention, it is possible to determine a supplementary learning path associated with a weak learning element of a learner to supplement the weak learning element.

DETAILED DESCRIPTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the locations or arrangements of individual elements within each of the embodiments may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

Figure 1:
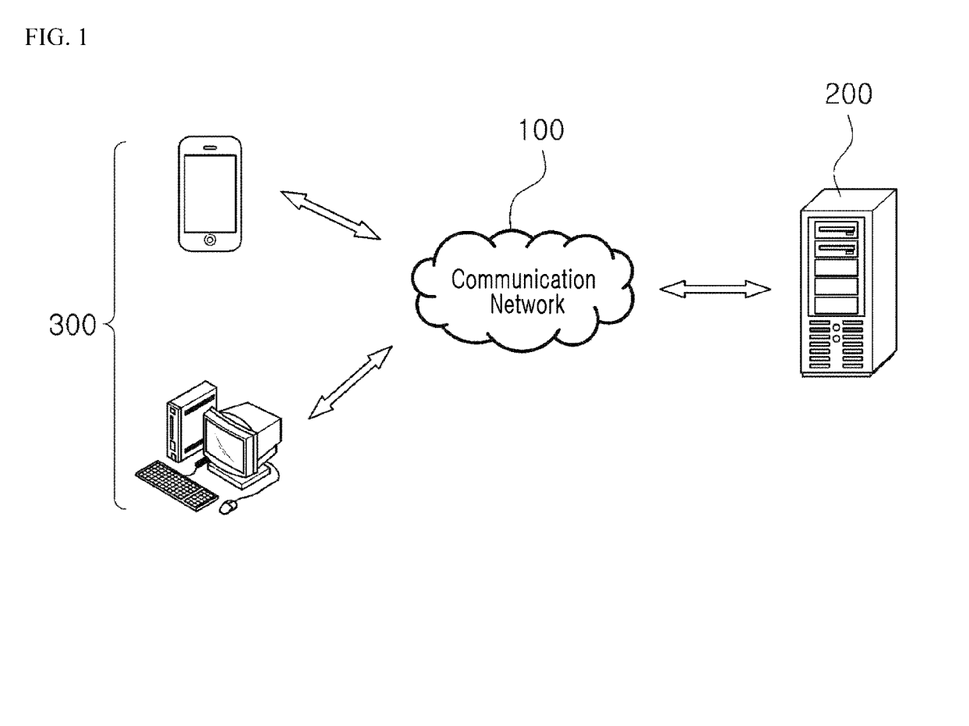
FIG. 1 schematically shows the configuration of an entire system for supporting learning according to one embodiment of the invention.

FIG. 1 schematically shows the configuration of the entire system for supporting learning according to one embodiment of the invention.

As shown in FIG. 1, the entire system according to one embodiment of the invention may comprise a communication network 100, a learning support system 200, and a learner device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution communication, Bluetooth communication (e.g., Bluetooth Low Energy communication), infrared communication, and ultrasonic communication.

Next, the learning support system 200 according to one embodiment of the invention may communicate with the learner device 300 to be described below via the communication network 100, and may function to acquire a learner's score for at least one assessment item included in a scoring table, wherein the learner has solved a question for learning and the scoring table is applied to a descriptive answer of the learner, to determine a weak learning element of the learner with reference to the acquired score and at least one learning element associated with the at least one assessment item, and to determine a supplementary learning path to be provided to the learner with reference to the determined weak learning element.

The configuration and functions of the learning support system 200 according to the invention will be discussed in more detail below. Meanwhile, although the learning support system 200 has been described as above, the above description is illustrative and it will be apparent to those skilled in the art that at least a part of the functions or components required for the learning support system 200 may be implemented or included in the learner device 300 to be described below or an external system (not shown), as necessary.

Next, the learner device 300 according to one embodiment of the invention is digital equipment that may function to connect to and then communicate with the learning support system 200 via the communication network 100, and any type of portable digital equipment having a memory means and a microprocessor for computing capabilities, such as a smart phone and a tablet PC, may be adopted as the learner device 300 according to the invention.

Meanwhile, according to one embodiment of the invention, the learner device 300 may include an application for supporting the provision of learning support functions according to the invention to the learner. The application may be downloaded from the learning support system 200 or an external application distribution server (not shown).

Configuration of the Learning Support System

Hereinafter, the internal configuration of the learning support system 200 crucial for implementing the invention and the functions of the respective components thereof will be discussed.

Figure 2:
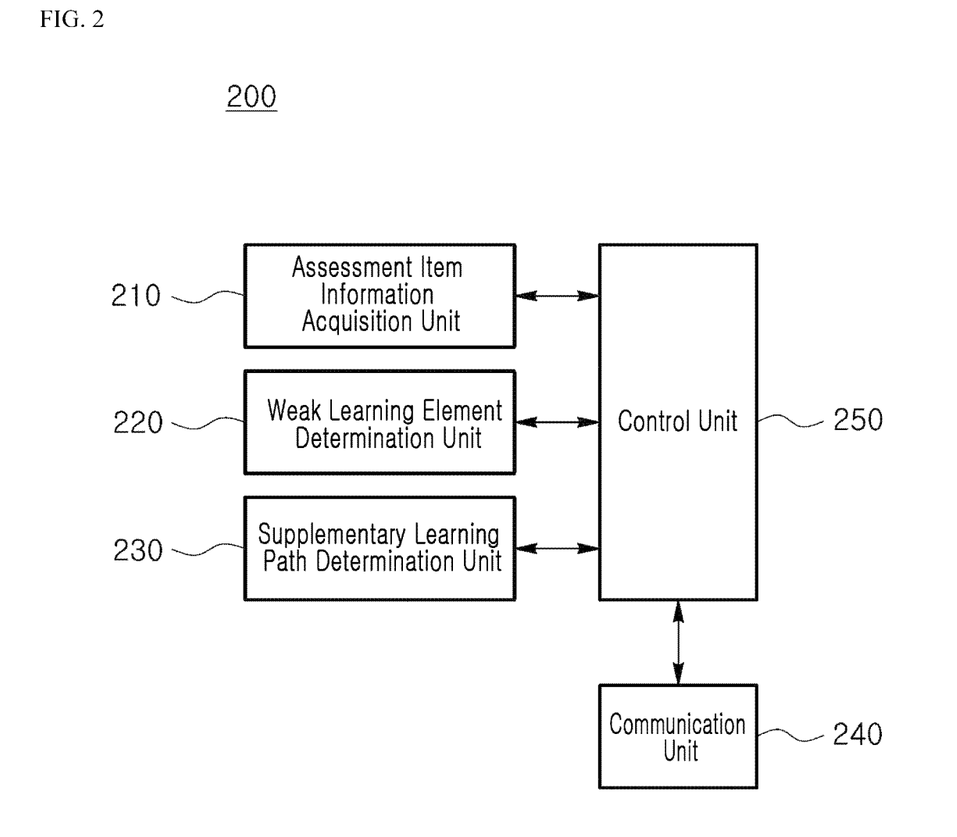
FIG. 2 specifically shows the internal configuration of a learning support system according to one embodiment of the invention.

FIG. 2 specifically shows the internal configuration of the learning support system 200 according to one embodiment of the invention.

The learning support system 200 according to one embodiment of the invention may be digital equipment having a memory means and a microprocessor for computing capabilities. The learning support system 200 may be a server system. As shown in FIG. 2, the learning support system 200 may comprise an assessment item information acquisition unit 210, a weak learning element determination unit 220, a supplementary learning path determination unit 230, a communication unit 240, and a control unit 250. According to one embodiment of the invention, at least some of the assessment item information acquisition unit 210, the weak learning element determination unit 220, the supplementary learning path determination unit 230, the communication unit 240, and the control unit 250 may be program modules to communicate with an external system. The program modules may be included in the learning support system 200 in the form of operating systems, application program modules, and other program modules, while they may be physically stored in a variety of commonly known storage devices. Further, the program modules may also be stored in a remote storage device that may communicate with the learning support system 200. Meanwhile, such program modules may include, but are not limited to, routines, subroutines, programs, objects, components, data structures and the like for performing specific tasks or executing specific abstract data types as will be described below in accordance with the invention.

First, the assessment item information acquisition unit 210 according to one embodiment of the invention may function to acquire a learner's score for at least one assessment item included in a scoring table, wherein the learner has solved a question for learning and the scoring table is applied to a descriptive answer of the learner. According to one embodiment of the invention, the scoring table applied to the descriptive answer may include at least one assessment item for each question for learning, and the assessment item is a detailed criterion item for giving a score based on allotted points to the descriptive answer of the learner to the question for learning. For example, the assessment item may be at least one partial process required for the learner to perform in order to solve the question for learning (e.g., a concept or expression included in an intermediate process in the case of mathematics or science, or a concept or process of logic/proof included in an intermediate process in the case of language or philosophy), or may be a partial correct answer or a partial solution to the question for learning.

Specifically, according to one embodiment of the invention, when the learner solves a question for learning and writes a descriptive answer, the assessment item information acquisition unit 210 may acquire, as the learner's score, a score that is given to the descriptive answer for each of at least one assessment item included in a scoring table as a result of scoring the descriptive answer according to the scoring table.

For example, according to one embodiment of the invention, when a question for learning should be solved by a process of (1) finding A, (2) using A to find B, and (3) using B to find C in order to get a correct answer to the question, at least one assessment item included in the scoring table may be (1) "A was correctly found?", (2) "B was correctly found through A?", and (3) "C was correctly found through B?", and the assessment item information acquisition unit 210 may acquire scores for the respective assessment items (1), (2) and (3) as the learner's score.

As another example, according to one embodiment of the invention, when a correct answer to a question for learning is to make some assumptions and draw conclusions therefrom, at least one assessment item included in the scoring table may be (1) "Was the process of proof logical?" (2) "Were correct assumptions presented?", and (3) "Were appropriate meanings derived from the results?", and the assessment item information acquisition unit 210 may acquire scores for the respective assessment items (1), (2) and (3) as the learner's score.

Meanwhile, according to one embodiment of the invention, the assessment item information acquisition unit 210 may acquire a score for at least one assessment item from a scoring result (or a scoring table) for a descriptive answer of the learner which is acquired through optical character recognition (OCR) or electronically entered.

Next, the weak learning element determination unit 220 according to one embodiment of the invention may determine a weak learning element of the learner with reference to the score acquired by the assessment item information acquisition unit 210 and at least one learning element associated with the at least one assessment item. According to one embodiment of the invention, the learning element associated with the assessment item may be a knowledge unit that is required for the learner so that the learner is determined to fulfill or understand the assessment item. For example, the knowledge unit may be a unit or curriculum in a course of study, and may be a concept, expression, symbol, type, difficulty, and the like of the course of study.

Specifically, according to one embodiment of the invention, the weak learning element determination unit 220 may determine the weak learning element with reference to at least one assessment item whose score acquired as above is lower than a predetermined level, and at least one learning element associated with the at least one assessment item. That is, the weak learning element according to one embodiment of the invention may be a part or all of the at least one learning element associated with the at least one assessment item whose score acquired as above is lower than the predetermined level.

For example, according to one embodiment of the invention, the weak learning element determination unit 220 may determine a learning element whose weight or appearance frequency is not less than a predetermined level, among at least one learning element associated with a plurality of assessment items whose scores are lower than a predetermined level, as the learner's weak learning element.

As another example, according to one embodiment of the invention, the weak learning element determination unit 220 may determine a learning element whose weakness index is not lower than a predetermined level, among at least one learning element associated with a plurality of assessment items whose scores are lower than a predetermined level, as the learner's weak learning element, wherein the weakness index is determined with reference to an appearance frequency of the learning element and a weight based on allotted points of the assessment items. Specifically, according to one embodiment of the invention, when the assessment items whose scores are lower than a predetermined level are A (3 points allotted), B (5 points allotted), and C (10 points allotted) and the learning elements associated with the three assessment items are a and b, a and c, and b and c, respectively, the weakness indexes of a, b and c are 8 (i.e., 3+5), 13 (i.e., 3+10), and 15 (i.e., 5+10), respectively, and thus the weak learning element determination unit 220 may determine the learning elements b and c whose weakness indexes are relatively high as the weak learning elements.

Further, according to one embodiment of the invention, the weak learning element determination unit 220 may determine a weak learning element of the learner with further reference to the learner's score for at least one other assessment item included in a scoring table applied to a descriptive answer of the learner to another question for learning, and at least one learning element associated with the at least one other assessment item.

Specifically, according to one embodiment of the invention, the weak learning element determination unit 220 may determine a weak learning element of the learner with reference to at least one learning element associated with an assessment item whose score is lower than a predetermined level, among at least one other assessment item included in a scoring table applied to a descriptive answer of the learner to another question for learning.

For example, according to one embodiment of the invention, learning elements a, b and c are included five times, one time, and four times, respectively, in learning elements associated with an assessment item whose score is lower than a predetermined level, among at least one assessment item included in a scoring table applied to a descriptive answer of the learner to a first question for learning, and the learning elements a, b and c are included one time, two times, and three times, respectively, in learning elements associated with an assessment item whose score is lower than the predetermined level, among at least one assessment item included in a scoring table applied to a descriptive answer of the learner to a second question for learning. In this case, the weak learning element determination unit 220 may determine the learning element c whose total number of inclusion is the greatest, among the learning elements associated with an assessment item whose score is lower than the predetermined level, as the weak learning element.

Further, according to one embodiment of the invention, the weak learning element determination unit 220 may determine not only a first learning element corresponding to an assessment item whose score is lower than a predetermined level, among at least one assessment item included in a scoring table applied to a descriptive answer of the learner to a question for learning, but also a second learning element having a predetermined relationship with the first learning element, as the weak learning element. According to one embodiment of the invention, at least one of the first and second learning elements may be determined as the weak learning element.

Specifically, according to one embodiment of the invention, the weak learning element determination unit 220 may determine, as the weak learning element, a second learning element that is at least a part of learning elements having a relationship of prior knowledge or posterior knowledge with a first learning element.

For example, according to one embodiment of the invention, when the first learning element is "Operations on Complementary Sets", the second learning element may be a learning element having a relationship of prior knowledge with the first learning element (e.g., "Definition of Sets" or "Operations on Sets") or a learning element having a relationship of posterior knowledge with the first learning element (e.g., "De Morgan's Law Using Operations on Complementary Sets").

As another example, according to one embodiment of the invention, when the first learning element is "Proof by Inductive Reasoning", the second learning element may be a learning element having a relationship of prior knowledge with the first learning element (e.g., "Concept of Proof") or a learning element having a relationship of posterior knowledge with the first learning element (e.g., "Refutation of Proof").

Further, according to one embodiment of the invention, the weak learning element determination unit 220 may acquire at least one learning element associated with at least one assessment item, with reference to tagging information assigned to the at least one assessment item. According to one embodiment of the invention, at least one learning element may be coded (e.g., as A001 ("Concept of Sets"), A101 ("Concept of Proof"), etc.) and included in the tagging information.

Meanwhile, according to one embodiment of the invention, the weak learning element determination unit 220 may acquire information on at least one learning element associated with an assessment item, with reference to a lookup table in which information on at least one learning element corresponding to the assessment item is stored.

Meanwhile, according to one embodiment of the invention, the weak learning element determination unit 220 may acquire at least one learning element associated with at least one assessment item by analyzing words, sentences, expressions, and the like of the at least one assessment item through deep learning or machine learning algorithms, and may assign tagging information to the at least one assessment item on the basis of the at least one acquired learning element. The deep learning or machine learning algorithms according to one embodiment of the invention may include a k-nearest neighbors (k-NN) algorithm, a recurrent neural network (RNN) algorithm, a convolutional neural network (CNN) algorithm, and the like.

For example, according to one embodiment of the invention, when the assessment item is "Correctly found $A^C$?", the weak learning element determination unit 220 may acquire "Concept of Complementary Sets" and "Understanding of Concept of Sets" as the learning elements associated with the assessment item, and may code the learning elements as A201 ("Concept of Complementary Sets") and A001 ("Concept of Sets"), respectively, and assign tagging information including the coded information to the corresponding assessment item.

As another example, according to one embodiment of the invention, when the assessment item is "Was the process of proof logical?", the weak learning element determination unit 220 may acquire "Concept of Proof" and "Types of Proof" as the learning elements associated with the assessment item, and may code the learning elements as A101 ("Concept of Proof") and A102 ("Types of Proof"), respectively, and assign tagging information including the coded information to the corresponding assessment item.

Next, according to one embodiment of the invention, the supplementary learning path determination unit 230 may determine a supplementary learning path to be provided to the learner with reference to the weak learning element determined by the weak learning element determination unit 220. According to one embodiment of the invention, the supplementary learning path may be specified by at least one question for supplementary learning intended to supplement the weak learning element of the learner.

Specifically, according to one embodiment of the invention, the supplementary learning path determination unit 230 may determine the supplementary learning path to be provided to the learner by specifying at least one of a unitary question containing the weak learning element one by one, an analogous question in which the weak learning element is combined with a plurality of other learning elements, and a question that is expected to be incorrectly answered and determined on the basis of the weak learning element and a history of the learner solving other questions for learning (e.g., a question in which the weak learning element is combined with weak learning elements determined from the other questions for learning) as the question for supplementary learning, with reference to the determined weak learning element.

For example, according to one embodiment of the invention, the supplementary learning path determination unit 230 may specify at least one of a unitary question, an analogous question, and a question expected to be incorrectly answered as the question for supplementary learning to be provided to the learner, on the basis of a score of an assessment item associated with the weak learning element and an appearance frequency of the weak learning element. More specifically, according to one embodiment of the invention, when an average score of assessment items associated with the weak learning element is lower than a predetermined level or an appearance frequency of the weak learning element is not less than a predetermined level, the supplementary learning path determination unit 230 may determine a unitary question as the question for supplementary learning to be provided to the learner, for basic learning of the weak learning element.

Further, according to one embodiment of the invention, the supplementary learning path determination unit 230 may determine the supplementary learning path to be provided to the learner, with further reference to the learner's score for at least one other assessment item included in a scoring table applied to a descriptive answer of the learner to another question for learning, and at least one learning element associated with the at least one other assessment item.

Specifically, according to one embodiment of the invention, the supplementary learning path determination unit 230 may determine the weak learning element of the learner with reference to at least one of a number of times (or frequency) at which the above weak learning element is determined as a weak learning element among learning elements associated with the at least one other assessment item for the another question for learning solved by the learner, and a number of times (or frequency) at which the above weak learning element is included in learning elements associated with an assessment item whose score is lower than a predetermined level, among the at least one other assessment item for the another question for learning solved by the learner.

For example, according to one embodiment of the invention, the supplementary learning path determination unit 230 may specify a unitary question as the question for supplementary learning when a frequency at which the weak learning element is determined as a weak learning element for the another question for learning is not less than a predetermined level; may specify a question expected to be incorrectly answered as the question for supplementary learning when the frequency is less than another predetermined level; and may specify an analogous question as the question for supplementary learning when the frequency is between the above predetermined levels.

Next, the communication unit 240 according to one embodiment of the invention may function to enable data transmission/reception from/to the assessment item information acquisition unit 210, the weak learning element determination unit 220, and the supplementary learning path determination unit 230.

Lastly, the control unit 250 according to one embodiment of the invention may function to control data flow among the assessment item information acquisition unit 210, the weak learning element determination unit 220, the supplementary learning path determination unit 230, and the communication unit 240. That is, the control unit 250 according to the invention may control data flow into/out of the learning support system 200 or data flow among the respective components of the learning support system 200, such that the assessment item information acquisition unit 210, the weak learning element determination unit 220, the supplementary learning path determination unit 230, and the communication unit 240 may carry out their particular functions, respectively.

Figure 3:
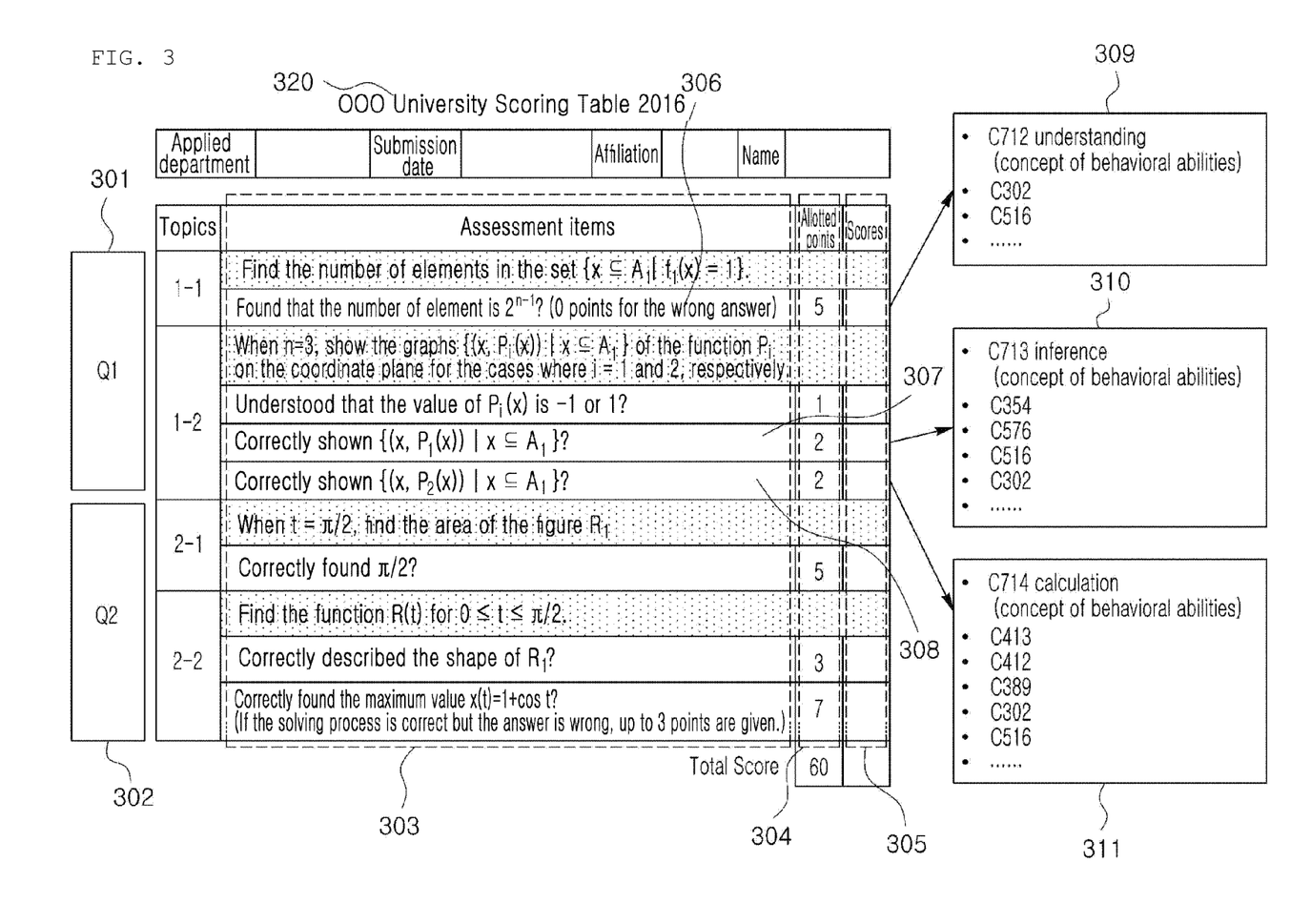
FIG. 3 illustratively shows a scoring table applied to descriptive answers of a learner who has solved questions for learning according to one embodiment of the invention.

FIG. 3 illustratively shows a scoring table applied to descriptive answers of a learner who has solved questions for learning according to one embodiment of the invention.

Referring to FIG. 3, a scoring table 320 applied to descriptive answers of a learner who has solved questions for learning 301 and 302 may include at least one assessment item 303 for each of the questions for learning, allotted points 304 of the at least one assessment item, a score 305 for the at least one assessment item, and the like.

First, according to one embodiment of the invention, the learning support system 200 may acquire, from the scoring table 320 applied to the descriptive answers of the learner who has solved the questions for learning, the score 305 of the learner for each of the at least one assessment item 303 included in the scoring table 320.

Next, according to one embodiment of the invention, the learning support system 200 may derive assessment items 306, 307 and 308 whose scores 305 are lower than a predetermined level, among the at least one assessment item 303 included in the scoring table 320.

Next, according to one embodiment of the invention, the learning support system 200 may determine learning elements C302 and C516 commonly included in the assessment items 306, 307 and 308 whose scores 305 are lower than the predetermined level, among at least one coded learning element 309, 310 and 311 associated with the assessment items 306, 307 and 308, as weak learning elements of the learner, on the basis of tagging information assigned to the at least one assessment item 303.

Next, according to one embodiment of the invention, the learning support system 200 may determine a supplementary learning path to be provided to the learner by specifying at least one of a unitary question, an analogous question, and a question expected to be incorrectly answered, which are associated with the weak learning elements C302 and C516, as a question for supplementary learning.

Although the embodiment in which a scoring table applied to descriptive answers of a learner who has solved questions for learning is used to support the learning of the learner has been mainly described above, the present invention may also be utilized in cases where the learner has solved a test in which multiple-choice questions, short-answer questions, or descriptive questions are mixed.

According to another embodiment of the invention, the learning support system 200 may acquire an optical mark reading (OMR) answer image of a learner who has solved a test including at least one question for learning among multiple-choice questions, short-answer questions, and descriptive questions.

Next, according to another embodiment of the invention, the learning support system 200 may acquire a learner code by which the learner can be identified and information on the test from the OMR answer image.

Next, according to another embodiment of the invention, the learning support system 200 may distinguish automatically scored questions (which can be automatically scored like multiple-choice or short-answer questions) and manually scored questions (for which automatic scoring is difficult like descriptive questions) on the basis of the acquired information on the test. With respect to the automatically scored questions, the learning support system 200 may recognize answers of the learner to the automatically scored questions from the OMR answer image of the learner and automatically score the answers. With respect to the automatically scored questions, the learning support system 200 may generate a scoring table including at least one assessment item for each of the manually scored questions, and may extract images including answer areas of the manually scored questions from the OMR answer image of the learner and provide the images to a scorer.

Next, according to another embodiment of the invention, when the scorer gives a score for each of the at least one assessment item on the basis of the scoring table, the learning support system 200 may acquire the learner's score for the at least one assessment item included in the scoring table.

Next, according to another embodiment of the invention, the learning support system 200 may determine a weak learning element of the learner with reference to the scores acquired for the automatically scored questions and the manually scored questions, and at least one learning element associated with at least one assessment item of the automatically scored questions and the manually scored questions, and may determine a supplementary learning path to be provided to the learner with reference to the determined weak learning element.

The embodiments according to the invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be configured to operate as one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a system for supporting learning, the system comprising an assessment item information acquisition unit, a weak learning element determination unit, and a supplementary learning path determination unit, and the method comprising the steps of:
   by the assessment item information acquisition unit, acquiring a learner's score for at least one assessment item included in a scoring table, wherein the learner has solved a question for learning and the scoring table is applied to a descriptive answer of the learner, and the scoring table includes information on a score that a scorer gives for the at least one assessment item;
   by the weak learning element determination unit, determining a weak learning element of the learner with reference to the acquired score and at least one learning element associated with the at least one assessment item, wherein the at least one learning element is a knowledge unit that is required for the learner so that the learner is determined to fulfill or understand the at least one assessment item; and
   by the supplementary learning path determination unit, determining a supplementary learning path to be provided to the learner with reference to the determined weak learning element
   wherein in the step of acquiring the score, the learner's score for the at least one assessment item is acquired by acquiring a scoring result for the descriptive answer of the learner through optical character recognition (OCR),
   wherein in the step of determining the weak learning element, the at least one learning element associated with the at least one assessment item is acquired by analyzing at least one of words, sentences, and expressions of the at least one assessment item using a convolutional neural network algorithm, the at least one acquired learning element is coded as predetermined codes, tagging information including information in which the at least one acquired learning element is coded is assigned to the at least one assessment item such that the at least one assessment item is linked to one or more of the predetermined codes, and
   wherein in the step of determining the weak learning element, the weak learning element is determined to be a first learning element corresponding to an assessment item for which the acquired score is lower than a predetermined level among the at least one assessment item, and a second learning element having a relationship of prior knowledge or posterior knowledge with the first learning element,
   wherein in the step of determining the weak learning element, the weak learning element is determined with further reference to allotted points corresponding to the at least one assessment item in the scoring table,
   wherein in the step of determining the supplementary learning path, the supplementary learning path is specified by at least one question for supplementary learning associated with the weak learning element,
   wherein in the step of determining the supplementary learning path, the at least one question for supplementary learning includes at least one of a unitary question in which the weak learning element is contained one by one, an analogous question in which the weak learning element is combined with another learning element, and a question expected to be incorrectly answered in which the weak learning element is combined with a weak learning element determined from another question for learning solved by the learner, and
   wherein in the step of determining the supplementary learning path, the unitary question is specified as the question for supplementary learning when a frequency at which the weak learning element is determined as a weak learning element for at least one other question for learning solved by the learner is not less than a first level, the question expected to be incorrectly answered is specified as the question for supplementary learning when the frequency is less than a second level, and the analogous question is specified as the question for supplementary learning when the frequency is between the first and second levels.

2. The method of claim 1, wherein in the step of determining the weak learning element, the weak learning element of the learner is determined with further reference to the learner's score for at least one other assessment item included in a scoring table applied to a descriptive answer of the learner to another question for learning, and at least one learning element associated with the at least one other assessment item.

3. A non-transitory computer-readable recording medium having stored thereon a computer program for executing the method of claim 1.

4. A system for supporting learning, the system comprising:
   an assessment item information acquisition unit configured to acquire a learner's score for at least one assessment item included in a scoring table, wherein the learner has solved a question for learning and the scoring table is applied to a descriptive answer of the learner, and the scoring table includes information on a score that a scorer gives for the at least one assessment item;
   a weak learning element determination unit configured to determine a weak learning element of the learner with reference to the acquired score and at least one learning element associated with the at least one assessment item, wherein the at least one learning element is a knowledge unit that is required for the learner so that the learner is determined to fulfill or understand the at least one assessment item; and a supplementary learning path determination unit configured to determine a supplementary learning path to be provided to the learner with reference to the determined weak learning element, wherein the assessment item information acquisition unit is configured to acquire the learner's score for the at least one assessment item by acquiring a scoring result for the descriptive answer of the learner through optical character recognition (OCR), wherein the weak learning element determination unit is configured to acquire the at least one learning element associated with the at least one assessment item by analyzing at least one of words, sentences, and expressions of the at least one assessment item using a convolutional neural network algorithm, to code the at least one acquired element as predetermined codes, and to assign tagging information including information in which the at least one acquired learning element is coded to the at least one assessment item such that the at least one assessment item is linked to one or more of the predetermined codes, wherein the weak learning element determination unit is configured to determine the weak learning element to be a first learning element corresponding to an assessment item for which the acquired score is lower than a predetermined level among the at least one assessment item, and a second learning element having a relationship of prior knowledge or posterior knowledge with the first learning element, wherein the weak learning element determination unit is configured to determine the weak learning element with further reference to allotted points corresponding to the at least one assessment item in the scoring table, wherein the supplementary learning path is specified by at least one question for supplementary learning associated with the weak learning element, wherein the at least one question for supplementary learning includes at least one of a unitary question in which the weak learning element is contained one by one, an analogous question in which the weak learning element is combined with another learning element, and a question expected to be incorrectly answered in which the weak learning element is combined with a weak learning element determined from another question for learning solved by the learner, and wherein the supplementary learning path determination unit is configured to specify the unitary question as the question for supplementary learning when a frequency at which the weak learning element is determined as a weak learning element for at least one other question for learning solved by the learner is not less than a first level, specify the question expected to be incorrectly answered as the question for supplementary learning when the frequency is less than a second level, and specify the analogous question as the question for supplementary learning when the frequency is between the first and second levels.

\* \* \* \* \*